US012345162B2

(12) United States Patent
Nesteroff et al.

(10) Patent No.: US 12,345,162 B2
(45) Date of Patent: Jul. 1, 2025

(54) ADJUSTABLE POSITION IMPELLER SHROUD FOR CENTRIFUGAL COMPRESSORS

(71) Applicant: Rolls-Royce Corporation, Indianapolis, IN (US)

(72) Inventors: Michael Nesteroff, Indianapolis, IN (US); Mark E. Whitlock, Indianapolis, IN (US); Nathanael Cooper, Indianapolis, IN (US); Jonathan Acker, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/512,672

(22) Filed: Nov. 17, 2023

(65) Prior Publication Data

US 2025/0163820 A1 May 22, 2025

(51) Int. Cl.

| | |
|---|---|
| ***F04D 29/42*** | (2006.01) |
| ***F01D 11/16*** | (2006.01) |
| ***F01D 11/22*** | (2006.01) |
| ***F01D 17/12*** | (2006.01) |
| ***F04D 29/46*** | (2006.01) |

(52) U.S. Cl.

CPC .............. *F01D 11/22* (2013.01); *F01D 11/16* (2013.01); *F01D 17/12* (2013.01); *F04D 29/4206* (2013.01); *F04D 29/464* (2013.01); *F05D 2230/60* (2013.01)

(58) Field of Classification Search

CPC .... F01D 11/22; F04D 29/403; F04D 29/4206; F04D 29/441; F04D 29/524; F04D 29/464

See application file for complete search history.

(56) References Cited

U.S. PATENT DOCUMENTS

| | | | | |
|---|---|---|---|---|
| 1,743,916 A * | 1/1930 | Hargis | .................. | F04D 29/167 415/196 |
| 3,085,398 A | 4/1963 | Ingleson | | |
| 4,069,662 A | 1/1978 | Redinger, Jr. et al. | | |
| 4,247,247 A | 1/1981 | Thebert | | |
| 4,264,271 A | 4/1981 | Libertini | | |
| 4,419,046 A | 12/1983 | Carlini | | |
| 4,472,108 A | 9/1984 | Pask | | |
| 4,683,716 A | 8/1987 | Wright et al. | | |
| 4,844,688 A | 7/1989 | Clough et al. | | |
| 5,017,088 A | 5/1991 | Miraucourt et al. | | |
| 5,018,942 A | 5/1991 | Ciokajlo et al. | | |

(Continued)

FOREIGN PATENT DOCUMENTS

| | | |
|---|---|---|
| JP | 02042197 A | 2/1990 |
| WO | 2014130159 A1 | 8/2014 |

*Primary Examiner* — Christopher R Legendre

(74) *Attorney, Agent, or Firm* — Barnes & Thornburg

(57) ABSTRACT

A compressor assembly for a gas turbine engine includes a shroud assembly, an outer case assembly, and a plurality of locating bolt assemblies. The shroud assembly extends circumferentially around the engine axis. The outer case assembly includes an outer case that extends circumferentially around the axis and a plurality of fasteners that couple the shroud assembly with the outer case. The plurality of locating bolt assemblies extend into the outer case and abut the shroud assembly at a predetermined axial location to axially locate the shroud assembly.

14 Claims, 6 Drawing Sheets

(56) References Cited

U.S. PATENT DOCUMENTS

| | | | |
|---|---|---|---|
| 5,049,033 | A | 9/1991 | Corsmeier et al. |
| 5,116,199 | A | 5/1992 | Ciokajlo |
| 5,211,534 | A | 5/1993 | Catlow |
| 5,263,816 | A | 11/1993 | Weimer et al. |
| 5,344,284 | A | 9/1994 | Delvaux et al. |
| 6,273,671 | B1 | 8/2001 | Ress |
| 6,401,460 | B1 | 6/2002 | Xia |
| 6,435,823 | B1 | 8/2002 | Schroder |
| 6,543,992 | B2 | 4/2003 | Webster |
| 6,877,952 | B2 | 4/2005 | Wilson |
| 6,935,836 | B2 | 8/2005 | Ress, Jr. et al. |
| 7,079,957 | B2 | 7/2006 | Finnigan et al. |
| 7,114,914 | B2 | 10/2006 | Gendraud et al. |
| 7,125,223 | B2 | 10/2006 | Turnquist et al. |
| 7,165,937 | B2 | 1/2007 | Dong et al. |
| 7,189,057 | B2 | 3/2007 | Lee et al. |
| 7,189,059 | B2 * | 3/2007 | Barton .................. F04D 29/685 415/191 |
| 7,220,097 | B2 | 5/2007 | Boeck |
| 7,326,027 | B1 | 2/2008 | Skoch et al. |
| 7,341,426 | B2 | 3/2008 | Schwarz et al. |
| 7,407,369 | B2 | 8/2008 | Schwarz et al. |
| 7,448,849 | B1 | 11/2008 | Webster et al. |
| 7,465,145 | B2 | 12/2008 | Kane |
| 7,491,029 | B2 | 2/2009 | Pezzetti, Jr. et al. |
| 7,654,791 | B2 | 2/2010 | Werner |
| 7,686,569 | B2 | 3/2010 | Paprotna et al. |
| 7,688,081 | B2 | 3/2010 | Webster |
| 7,708,518 | B2 | 5/2010 | Chehab |
| 7,824,151 | B2 | 11/2010 | Schwarz et al. |
| 7,874,793 | B2 | 1/2011 | Razzell et al. |
| 8,011,883 | B2 | 9/2011 | Schwarz et al. |
| 8,047,773 | B2 | 11/2011 | Bruce et al. |
| 8,087,880 | B2 | 1/2012 | Karafillis et al. |
| 8,105,012 | B2 | 1/2012 | Anema |
| 8,126,628 | B2 | 2/2012 | Hershey et al. |
| 8,186,945 | B2 | 5/2012 | Bhatnagar et al. |
| 8,256,228 | B2 | 9/2012 | O'Leary |
| 8,272,835 | B2 | 9/2012 | Smith |
| 8,296,037 | B2 | 10/2012 | Plunkett et al. |
| 8,534,996 | B1 | 9/2013 | Pankey et al. |
| 8,550,767 | B2 | 10/2013 | Horn et al. |
| 8,555,477 | B2 | 10/2013 | Bates |
| 8,602,724 | B2 | 12/2013 | Takahashi et al. |
| 8,608,427 | B2 | 12/2013 | Bck |
| 8,616,827 | B2 | 12/2013 | O'Leary |
| 8,678,742 | B2 | 3/2014 | Klingels |
| 8,721,270 | B2 | 5/2014 | Graefe et al. |
| 8,734,090 | B2 | 5/2014 | Lewis |
| 8,790,067 | B2 | 7/2014 | Mccaffrey et al. |
| 8,894,358 | B2 | 11/2014 | Bacic |
| 8,894,362 | B2 | 11/2014 | Fretwell |
| 8,939,709 | B2 | 1/2015 | Nanukuttan et al. |
| 8,939,715 | B2 | 1/2015 | Miller |
| 8,944,756 | B2 | 2/2015 | Lagueux |
| 8,961,115 | B2 | 2/2015 | Rhoden et al. |
| 8,998,563 | B2 | 4/2015 | Rioux |
| 9,097,133 | B2 | 8/2015 | Dong et al. |
| 9,121,302 | B2 | 9/2015 | Duong et al. |
| 9,212,667 | B2 | 12/2015 | Sun et al. |
| 9,228,447 | B2 | 1/2016 | Mccaffrey |
| 9,260,974 | B2 | 2/2016 | Hasting et al. |
| 9,309,777 | B2 | 4/2016 | Webster et al. |
| 9,316,111 | B2 | 4/2016 | Eleftheriou et al. |
| 9,341,074 | B2 | 5/2016 | Schimmels et al. |
| 9,353,641 | B2 | 5/2016 | Philippot |
| 9,435,218 | B2 | 9/2016 | Casavant et al. |
| 9,441,499 | B2 | 9/2016 | Casavant et al. |
| 9,458,855 | B2 | 10/2016 | Dierksmeier et al. |
| 9,476,690 | B2 | 10/2016 | Javelot et al. |
| 9,488,060 | B2 | 11/2016 | Bowman |
| 9,567,865 | B2 | 2/2017 | Jalbert et al. |
| 9,587,507 | B2 | 3/2017 | Ottow |
| 9,598,971 | B2 | 3/2017 | Hasnedl et al. |
| 9,598,974 | B2 | 3/2017 | Gekht et al. |
| 9,598,975 | B2 | 3/2017 | Uskert et al. |
| 9,752,450 | B2 | 9/2017 | Duguay et al. |
| 9,784,117 | B2 | 10/2017 | Duguay et al. |
| 9,840,932 | B2 | 12/2017 | Ballard, Jr. et al. |
| 9,874,105 | B2 | 1/2018 | Callaghan |
| 9,915,163 | B2 | 3/2018 | Mccaffrey |
| 9,951,643 | B2 | 4/2018 | Duguay |
| 9,957,830 | B2 | 5/2018 | Mccaffrey et al. |
| 10,018,067 | B2 | 7/2018 | Klasing et al. |
| 10,053,999 | B2 | 8/2018 | Mccaffrey et al. |
| 10,066,497 | B2 | 9/2018 | Duguay |
| 10,087,772 | B2 | 10/2018 | Sun et al. |
| 10,100,842 | B2 * | 10/2018 | Bromann ............ F04D 29/4206 |
| 10,113,556 | B2 | 10/2018 | Moniz et al. |
| 10,138,752 | B2 | 11/2018 | Schilling |
| 10,184,348 | B2 | 1/2019 | Carlucci et al. |
| 10,227,879 | B2 | 3/2019 | Moniz et al. |
| 10,301,961 | B2 | 5/2019 | Davis et al. |
| 10,309,246 | B2 | 6/2019 | Miranda |
| 10,309,409 | B2 | 6/2019 | Nesteroff et al. |
| 10,309,410 | B2 | 6/2019 | Ottow et al. |
| 10,316,684 | B2 | 6/2019 | Duguay |
| 10,316,685 | B2 | 6/2019 | Davis et al. |
| 10,316,686 | B2 | 6/2019 | Hudson et al. |
| 10,323,535 | B2 | 6/2019 | Davis et al. |
| 10,323,536 | B2 | 6/2019 | Hill |
| 10,329,940 | B2 | 6/2019 | Ballard, Jr. et al. |
| 10,352,329 | B2 | 7/2019 | Nesteroff et al. |
| 10,358,933 | B2 | 7/2019 | Moxon |
| 10,364,694 | B2 | 7/2019 | Ribarov et al. |
| 10,364,696 | B2 | 7/2019 | Virkler |
| 10,370,999 | B2 | 8/2019 | Blaney et al. |
| 10,371,050 | B2 | 8/2019 | Iwrey |
| 10,393,149 | B2 | 8/2019 | Mondal et al. |
| 10,400,620 | B2 | 9/2019 | Ribarov et al. |
| 10,408,226 | B2 | 9/2019 | Ottow et al. |
| 10,415,417 | B2 | 9/2019 | Mccaffrey |
| 10,415,419 | B2 | 9/2019 | Sun et al. |
| 10,415,421 | B2 | 9/2019 | Arnold et al. |
| 10,428,675 | B2 | 10/2019 | Szarvasy |
| 2008/0134659 | A1 | 6/2008 | Schwarz et al. |
| 2011/0002774 | A1 | 1/2011 | Karafillis et al. |
| 2013/0034425 | A1 | 2/2013 | Biscay et al. |
| 2014/0017600 | A1 | 1/2014 | Brandt et al. |
| 2016/0084101 | A1 | 3/2016 | Mccaffrey |
| 2016/0123172 | A1 | 5/2016 | Mondal et al. |
| 2016/0305269 | A1 | 10/2016 | Blaney et al. |
| 2016/0312644 | A1 | 10/2016 | Blaney et al. |
| 2016/0369644 | A1 | 12/2016 | Blaney et al. |
| 2017/0108004 | A1 | 4/2017 | Schuldt et al. |
| 2017/0175750 | A1 | 6/2017 | Mcmanus |
| 2017/0306785 | A1 | 10/2017 | Rioux et al. |
| 2017/0342996 | A1 | 11/2017 | Nesteroff et al. |
| 2018/0023412 | A1 | 1/2018 | Rizzi et al. |
| 2018/0112550 | A1 | 4/2018 | Dierksmeier et al. |
| 2019/0010822 | A1 | 1/2019 | Mccaffrey et al. |
| 2019/0010823 | A1 | 1/2019 | Sun et al. |
| 2019/0078459 | A1 | 3/2019 | Eastwood et al. |
| 2019/0085710 | A1 | 3/2019 | Van Der Merwe et al. |
| 2019/0128286 | A1 | 5/2019 | Skertic |
| 2019/0195081 | A1 | 6/2019 | Kim |
| 2019/0242303 | A1 | 8/2019 | Menheere et al. |

* cited by examiner

ADJUSTABLE POSITION IMPELLER SHROUD FOR CENTRIFUGAL COMPRESSORS

FIELD OF THE DISCLOSURE

The present disclosure relates generally to turbine engines with a centrifugal compressor, and more specifically, to shroud assemblies for centrifugal compressors.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

One type of compressor used in turbine machines, such as a gas turbine engines, is a centrifugal compressor. In some turbine machines, centrifugal compressors are used as the final stage in a multi-stage compressor section in a gas turbine engine. Typical centrifugal compressors include an impeller for compressing air and a shroud arranged around the impeller to direct the air through the compressor. It may be desirable to minimize a gap between the impeller and the shroud to reduce leakage and improve efficiency of the compressor while providing clearance to avoid contact between the impeller and the shroud. It may be desirable to adjust a size of the gap during assembly of the centrifugal compressor.

SUMMARY

The present disclosure may comprise one or more of the following features and combinations thereof.

A compressor assembly for a gas turbine engine may include, an impeller arranged around an axis and configured to rotate about the axis to provide compressed air, a shroud assembly that extends circumferentially around the impeller to direct the compressed air through the impeller, an outer case assembly configured to support the shroud assembly at a desired axial location relative to the impeller, the outer case assembly having an outer case that extends circumferentially around the axis and a plurality of fasteners that extend into the outer case and the shroud assembly to couple the shroud assembly with the outer case, and a plurality of locating bolt assemblies configured to selectively adjust the axial location of the shroud assembly relative to the outer case and the impeller, the plurality of locating bolt assemblies extend axially into the outer case and have terminal ends that terminate at a predetermined axial location relative to the impeller and abut the shroud assembly such that the plurality of fasteners urge the shroud assembly into abutting contact with the terminal ends of the plurality of locating bolt assemblies at an axial locating surface to axially locate the shroud assembly relative to the impeller to provide a desired size of a gap between the shroud assembly and the impeller at cold build of the compressor assembly.

In some embodiments, each of the plurality of locating bolt assemblies of the compressor assembly may include a locating bolt that extends axially through the outer case and defines the terminal end of the locating bolt assembly that abuts the shroud assembly and at least one shim that is located axially between the locating bolt and the outer case to cause the terminal end of the locating bolt to terminate at the predetermined axial location.

In some embodiments, the terminal end of each locating bolt of the compressor assembly, may terminate at an axial location forward of an axial location of a terminating end of each fastener included in the plurality of fasteners.

In some embodiments, the terminal end of at least three locating bolts abut an axial facing and radially extending positioning surface of the shroud assembly without coupling with the shroud assembly.

In some embodiments, the outer case assembly further includes a plurality of seals that engage the shroud assembly and the outer case to prevent the compressed air from passing between the shroud assembly and the outer case, wherein the plurality of seals includes a first seal located radially outward of the plurality of fasteners and the plurality of locating bolt assemblies and a second seal located radially inward of the plurality of fasteners and the plurality of locating bolt assemblies.

In some embodiments, the first seal abuts the shroud assembly at a first sealing surface and the second seal abuts the shroud assembly at a second sealing surface wherein the first sealing surface and the second sealing surface are not coplanar with the axial positioning surface of the shroud assembly.

In some embodiments, the first sealing surface and the second sealing surface are coplanar with the axial positioning surface of the shroud assembly.

In some embodiments, the outer case and the shroud assembly comprise a pilot interface, the pilot interface comprising a first surface of the outer case that faces radially inward and extends circumferentially about the axis and a second surface of the shroud assembly that faces radially outward and extends circumferentially about the axis, wherein the first surface engages the second surface to position the shroud assembly radially relative to the impeller.

In some embodiments, the shroud assembly includes a case mount that couples the shroud assembly to the outer case assembly, an impeller shroud which confronts the impeller, and a shroud body that extends between and interconnects the impeller shroud and the case mount.

In some embodiments, the shroud body includes an air piston formed to define a chamber adapted to receive actuation air to selectively move the impeller shroud axially relative to the impeller to adjust the size of the gap between the impeller shroud assembly and the impeller during use of the compressor assembly.

In some embodiments, the shroud body is shaped to define a U-shaped cross section when viewed normal to the axis, the U-shaped cross section includes a concave surface exposed to a first pressure and a convex surface exposed to a second pressure wherein changes to the first and second pressures cause the shroud body to flex and move the impeller shroud axially during use of the compressor assembly.

According to another aspect of the present disclosure, a compressor assembly for a gas turbine engine may comprise a shroud assembly that extends circumferentially around an axis, an outer case assembly that includes an outer case that extends circumferentially around the axis and a plurality of fasteners that extend into the outer case and the shroud assembly to couple the shroud assembly with the outer case, and a plurality of locating bolt assemblies that extend into the outer case and abut the shroud assembly at a predetermined axial location to axially locate the shroud assembly relative to the axis.

In some embodiments, each of the plurality of locating bolt assemblies includes a bolt having a terminal end that terminates at a predetermined axial location relative to the axis.

In some embodiments, each of the plurality of locating bolt assemblies further include a shim located between the outer case and the bolt to adjust the predetermined axial location of the terminal end of the bolt relative to the axis.

In some embodiments, the outer case assembly further includes a plurality of seals that engage the shroud assembly and the outer case to prevent compressed air from passing between the shroud assembly and the outer case, wherein the plurality of seals includes a first seal located radially outward of the plurality of fasteners and the plurality of locating bolt assemblies and a second seal located radially inward of the plurality of fasteners and the plurality of locating bolt assemblies.

In some embodiments, the outer case assembly is formed to define a first seal cavity to house the first seal and a second seal cavity to house the second seal.

In some embodiments, the shroud assembly blocks access into the first seal cavity to stop the first seal from escaping the first seal cavity and the shroud assembly blocks access to the second seal cavity to stop the second seal from escaping the second seal cavity.

According to another aspect of the present disclosure, a method of assembling a compressor assembly may comprise inserting locating bolts through an outer case that extends circumferentially about an axis such that the locating bolts terminate at a predetermined axial location relative to the axis, moving a shroud assembly relative to the outer case such that the shroud assembly abuts the locating bolts, and inserting a plurality of fasteners through the outer case to couple the shroud assembly with the outer case such that the locating bolts locate the shroud assembly axially relative to the outer case.

In some embodiments, the method may further comprise, arranging the outer case and shroud assembly around an impeller, measuring a size of a gap between the impeller and the shroud assembly, and inserting shims between the locating bolts and the outer case to adjust the size of the gap.

In some embodiments, the method may further comprise, loosening the plurality of fasteners from external the outer case opposite the shroud assembly without uncoupling the shroud assembly from the outer case, removing the locating bolts from outside the outer case, aligning a shims with the outer case, inserting the locating bolts through the shims and into the outer case, and tightening the plurality of fasteners to cause the shroud assembly to abut the plurality of locating bolts.

These and other features of the present disclosure will become more apparent from the following description of the illustrative embodiments.

DETAILED DESCRIPTION OF THE DRAWINGS

Figure 1:
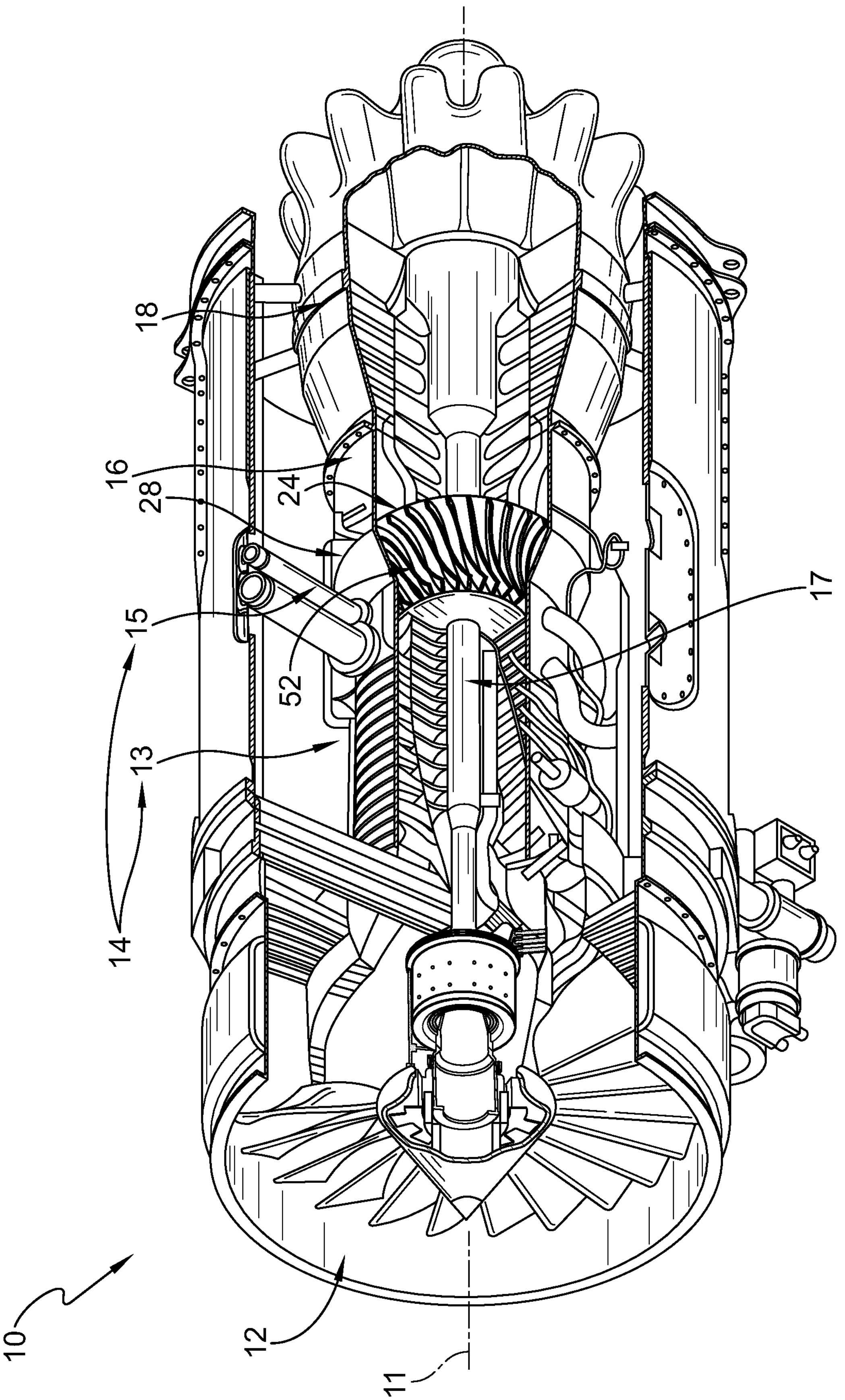
FIG. 1 is a schematic and cut-away view of a gas turbine engine comprising a fan, a compressor section having an axial compressor and a centrifugal compressor, a combustor, and a turbine section.

For the purposes of promoting an understanding of the principles of the disclosure, reference will now be made to a number of illustrative embodiments illustrated in the drawings and specific language will be used to describe the same.

An illustrative gas turbine engine 10 includes a fan 12, a compressor 14, a combustor 16 fluidly coupled to the compressor 14, a turbine 18 fluidly coupled to the combustor 16 as shown in FIG. 1. The illustrative compressor 14 comprises an axial compressor 13 and a centrifugal compressor 15 downstream of the axial compressor 13 as shown in FIG. 1.

Figure 2:
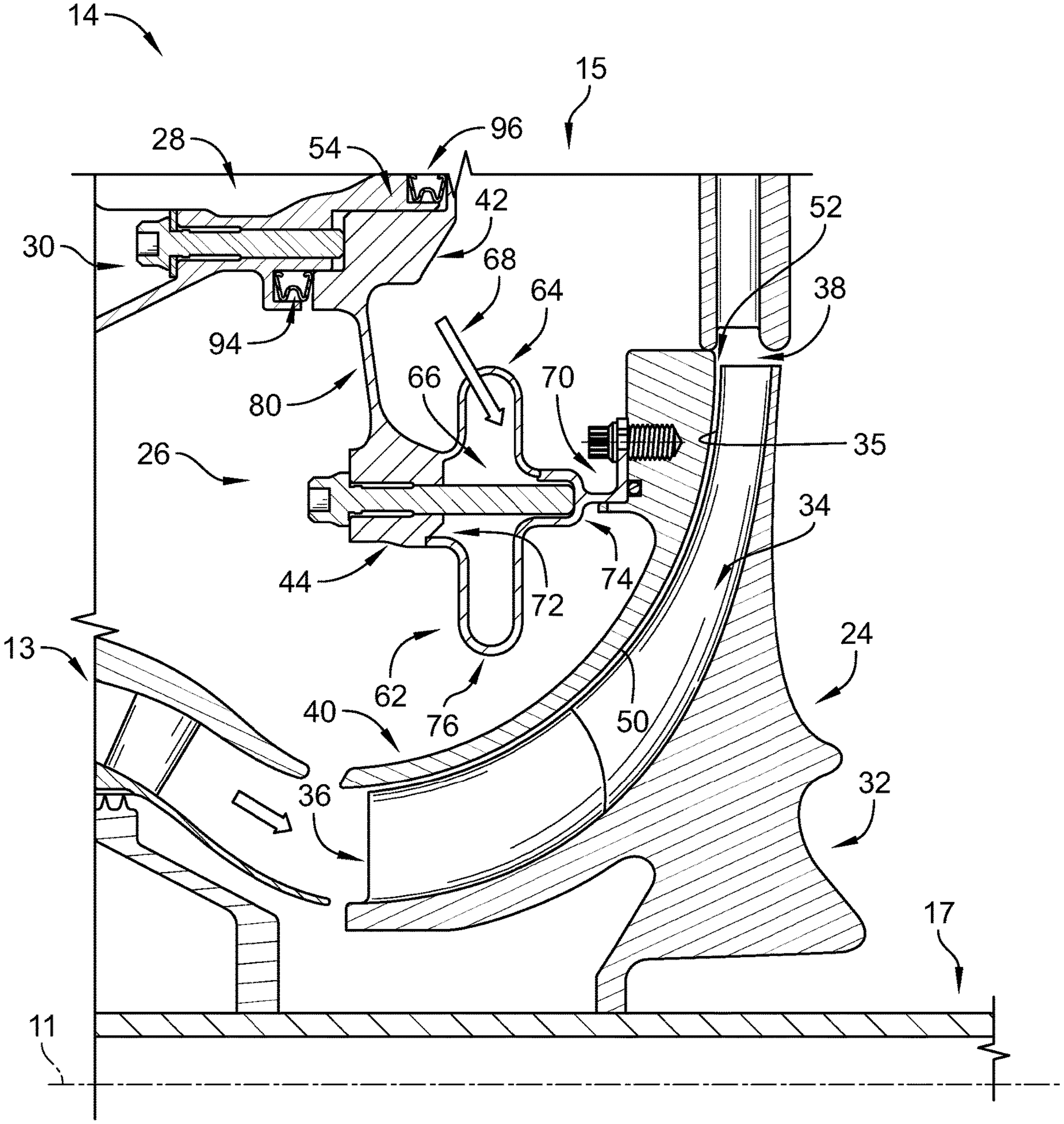
FIG. 2 is a schematic and sectional view of a portion of the centrifugal compressor assembly of FIG. 1 showing the compressor assembly having an impeller configured to compress air, a shroud assembly arranged around the impeller, an outer case coupled with the shroud assembly, and a plurality of locating bolt assemblies configured to selectively adjust the axial location of the shroud assembly relative to the outer case and the impeller.

The centrifugal compressor 15 comprises an impeller 24, a shroud assembly 26 and an outer case assembly 28 as shown in FIGS. 1 and 2. The present disclosure is directed to a system for selectively adjusting the axial location of the shroud assembly 26 relative to the outer case assembly 28 and impeller 24 to set a desired impeller tip clearance 52 at cold build between the shroud assembly 26 and the impeller 24 without having to disassemble the centrifugal compressor 15 from the gas turbine engine 10. This is beneficial during engine build, testing and overhaul, and during compressor rig testing.

The fan 12 is driven by the turbine 18 through the shaft 17 of the gas turbine engine 10 and provides thrust for propelling an aircraft by forcing air through the gas turbine engine 10 as suggested in FIG. 1. The compressor 14 compresses some of the air from the fan 12. In the illustrative embodiment, this air is first compressed to an intermediate pressure by the axial compressor 13 and then further compressed to a higher pressure by the centrifugal compressor 15. The centrifugal compressor 15 delivers the high pressure air to the combustor 16. The combustor 16 mixes fuel with the high pressure air and ignites the fuel to produce hot, high pressure combustion products. The hot, high pressure combustion products of the combustion reaction in the combustor 16 are directed into the turbine 18 to cause the turbine 18 to rotate about an axis 11 of the gas turbine engine 10. The turbine 18 extracts mechanical work from the hot, high pressure combustion products to drive the compressor 14 and the fan 12 through the shaft 17 of the gas turbine engine 10.

The centrifugal compressor 15 is configured to compress the air received from the axial compressor 13 as suggested in FIG. 2. The centrifugal compressor 15 includes the impeller 24, the shroud assembly 26, the outer case assembly 28, and a plurality of locating bolt assemblies 30.

The impeller 24 is arranged around the axis 11 and configured to rotate about the axis 11 to compress the air received from the axial compressor 13 as suggested in FIG. 2. The impeller 24 includes an impeller disk 32, and a plurality of impeller blades 34 extending radially outward from the impeller disk 32. The radially outward surface of each of the plurality of impeller blades 34 constitutes an impeller blade tip 35. The impeller disk 32 is coupled to the shaft 17 which in turn, is coupled to the turbine 18. The impeller disk 32 rotates the plurality of impeller blades 34 around the axis 11. The plurality of impeller blades 34 are configured to receive air from the axial compressor 13 at an axially forward position 36 at an inlet pressure, and eject the air at an axial aft and radially outward position 38 at an exit pressure which is greater than the inlet pressure.

As shown in FIG. 2, the shroud assembly 26 extends circumferentially around the impeller 24 to direct the compressed air through the impeller 24. The shroud assembly 26 includes an impeller shroud 40, a case mount 42 and a shroud body 44. The impeller shroud 40 confronts the impeller 24 to direct the compressed air through the impeller 24 in between the plurality of impeller blades 34 and impede the compressed air from passing over the plurality of impeller blade tips 35. The case mount 42 couples the shroud assembly 26 to the outer case assembly 28. The shroud body 44 couples the impeller shroud 40 to the case mount 42.

The impeller shroud 40 comprises a radially inward surface 50 that confronts the impeller blade tips 35. The distance between the radially inward surface 50 and the impeller blade tips 35 is the impeller tip clearance 52. During engine operation, thermal and mechanical forces act on various components of the centrifugal compressor 15 causing variations in the impeller tip clearance 52. For most operating conditions, the impeller tip clearance 52 is larger than desired for the most efficient operation of the centrifugal compressor 15. This larger than desired impeller tip clearance 52, avoids the impeller blade tips 35 from impinging the radially inward surface 50 of the impeller shroud 40, but also allow higher than desired air leakage around the impeller blade tips 35. In order to improve efficiency of the centrifugal compressor 15 during engine operation, it is desired to minimize the impeller tip clearance 52 without the impeller blade tips 35 impinging the radially inward surface 50 of the impeller shroud 40.

In the illustrative embodiment, the shroud body 44 comprises a clearance control system 60 to dynamically move the impeller shroud 40 axially relative to the impeller blade tips 35 to maintain the desired impeller tip clearance 52 during engine operation. The clearance control system 60 comprises an actuator 62 to dynamically move the impeller shroud 40 axially to maintain the desired impeller tip clearance 52 during engine operation. In other embodiments, a passive tip clearance control system 60 may be used.

In one embodiment, as shown in FIG. 2, the actuator 62 comprises an air piston 64 to dynamically move the impeller shroud 40 axially. The air piston 64 comprises a chamber 66 adapted to receive actuating air 68 from an engine control system (not shown) and an aft extending mounting arm 70 which couples the impeller shroud 40 to the shroud assembly 26. The chamber 66 comprises a forward rigid member 72, an aft rigid member 74 and a central flex member 76 disposed between the forward rigid member 72 and the aft rigid member 74. As the actuating air 68 increases pressure in the chamber 66, the central flex member 76 flexes and moves the aft rigid member 74 away from the forward rigid member 72 which, in turn, moves the impeller shroud 40 aft. Conversely, as the actuating air 68 decreases pressure in the chamber 66, the central flex member 76 contracts and moves the aft rigid member 74 towards the forward rigid member 72 and in turn moves the impeller shroud 40 forward.

As shown in FIG. 2, the shroud assembly 26 further comprises a case mount 42 which couples the shroud assembly 26 to the outer case assembly 28. The case mount 42 comprises a case mount arm 80 which extends radially inward and axially aft of the case mount 42 and couples the case mount 42 to the shroud body 44.

As shown in FIG. 2, the outer case assembly 28 is configured to support the shroud assembly 26 at a desired axial location relative to the impeller 24 and position the shroud assembly 26 around axis 11. The outer case assembly 28 comprises an outer case 54, a plurality of fasteners 46 (not shown in FIG. 2), a plurality of locating bolt assemblies 30, an inner seal 94 and an outer seal 96. The outer case 54 extends circumferentially around the axis 11 and keeps the high pressure gas from escaping the gas turbine engine 10 as it passing through the axial compressor 13 and centrifugal compressor 15.

Figure 3:
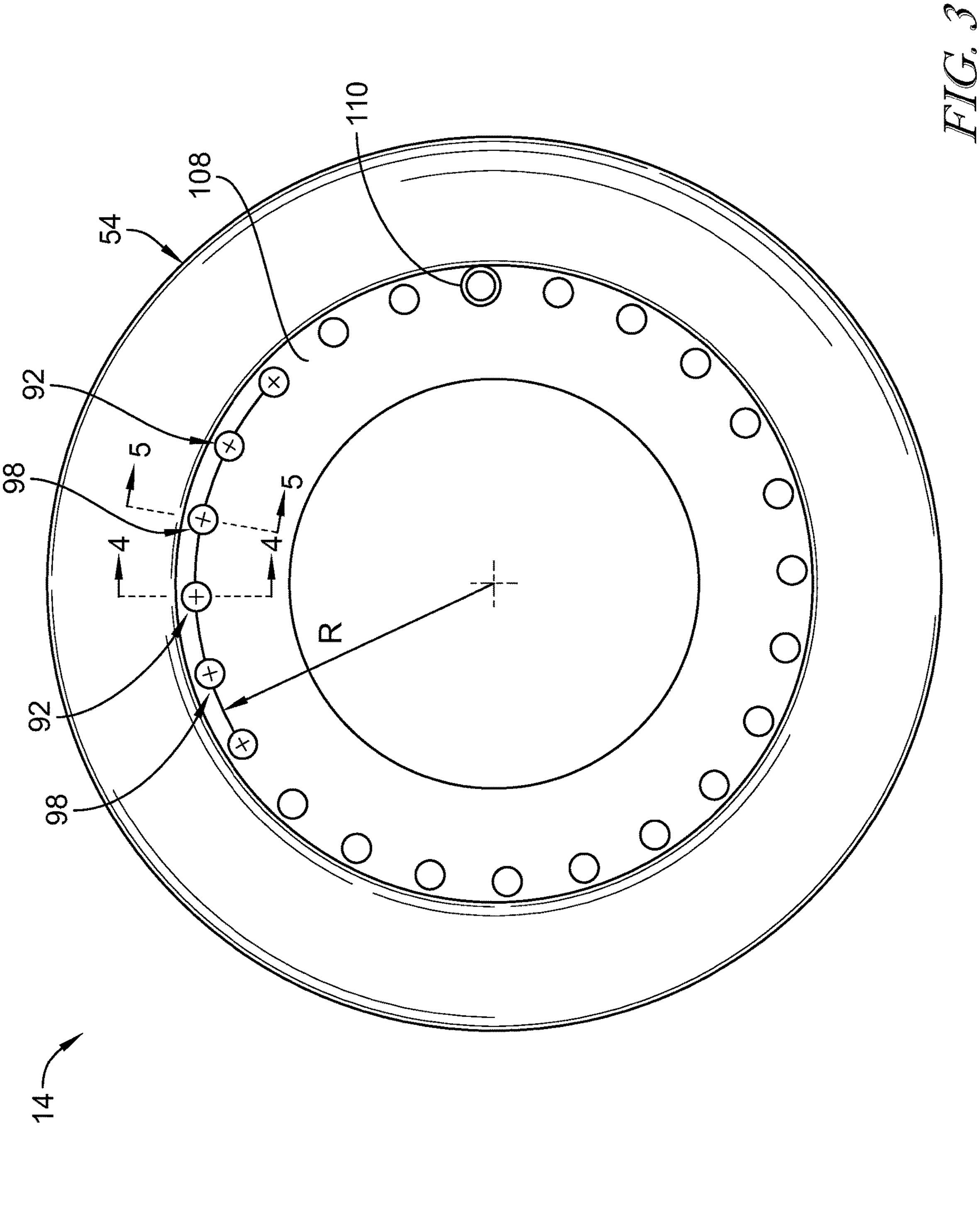
FIG. 3 is a schematic view front elevation view of the outer case of FIG. 2 showing the plurality of locating bolt assemblies and a plurality of fasteners that extend into the outer case.

As shown in FIG. 3, the outer case 54 comprises a plurality of non-threaded thru holes 98 and a plurality of threaded thru holes 92 located on a mating surface 108 on the outer case 54. In another embodiment, the mating surface 108 may be a plurality of spot faces 110 on the outer case 54. The plurality of non-threaded thru holes 98 and the plurality of threaded thru holes 92 may be located at the same radial distance R from the axis 11 and located circumferentially around the axis 11. In other embodiments, the plurality of non-threaded thru holes 98 and the plurality of threaded thru holes 92 may be located at different radial distances from the axis 11 and located circumferentially around axis 11.

Figure 4:
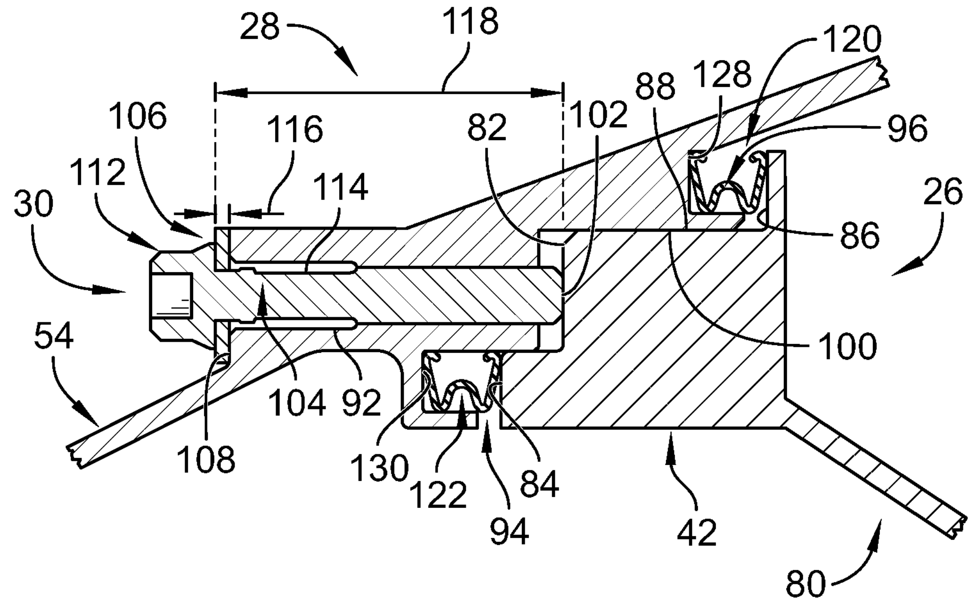
FIG. 4 is an enlarged schematic and sectional view taken along line 4-4 of FIG. 3 showing the shroud assembly, the outer case and one of the locating bolt assemblies and further showing the locating bolt assembly abuts the shroud assembly to locate the shroud assembly axially relative to the outer case.

FIG. 4 shows a cross section through one of the plurality of threaded thru holes 92 in the outer case 54. The plurality of locating bolt assemblies 30 extend axially through the threaded thru holes 92 in the outer case 54 and abut the axial positioning surface 82 of the case mount 42 to axially position the shroud assembly 26 relative to the impeller 24. The plurality of locating bolt assemblies 30 as shown in FIG. 4 may comprise a locating bolt 104 and a shim 106 to selectively position the axial location of the shroud assembly 26 relative to the outer case 54 and the impeller 24.

The locating bolt 104 comprises a bolt head 112 a threaded shank 114 and a terminal end 102 that is threaded into one of the plurality of threaded thru holes 92 and extends through the outer case 54. The locating bolt length 118 is the distance from the bolt head 112 to the terminal end 102. The shim 106 is positioned between the bolt head 112 and the mating surface 108 of the outer case 54 and is a desired thickness 116 to position the terminal end 102 of the locating bolt 104 at a desired axial location.

In one embodiment, the plurality of locating bolt assemblies 30 all have a shim 106 that is the same desired thickness 116. In another embodiment, at least one of the plurality of locating bolt assemblies 30 may have a shim 106 that has a different desired thickness 116 than the other plurality of locating bolt assemblies 30.

In another embodiment, at least one of the plurality of locating bolt assemblies 30 may comprise only a locating bolt 104 that may be threaded into the threaded thru holes 92 of the outer case 54 until the bolt head 112 abuts the mating surface 108 of the outer case 54 to position the terminal end 102 of the locating bolt 104 at a desired axial location. In yet another embodiment, the plurality of locating bolt assemblies 30 may comprise only a locating bolt 104 that may be threaded into the threaded thru holes 92 of the outer case 54 until the bolt head 112 abuts the mating surface 108 of the outer case 54 to position the terminal end 102 of the plurality of locating bolts 104 at a desired axial location.

Figure 5:
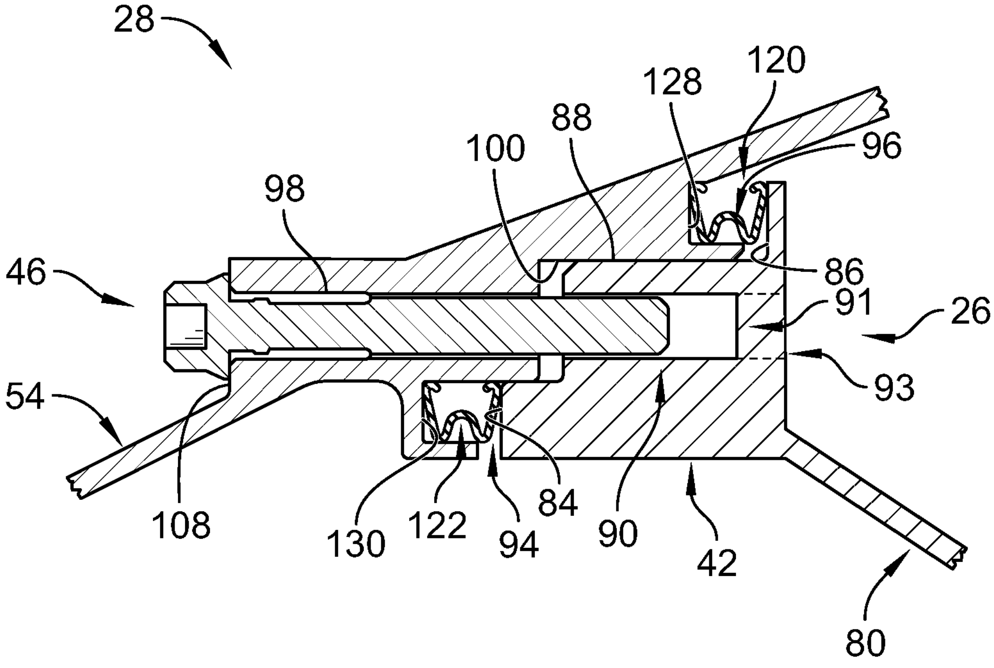
FIG. 5 is an enlarged schematic and sectional view taken along line 5-5 of FIG. 3 showing the outer case and one of the fasteners extending through the outer case and into the shroud assembly to couple the shroud assembly with the outer case.

FIG. 5 shows a cross section through one of the plurality of non-threaded thru holes 98 in the outer case 54. The plurality of non-threaded thru holes 98 in the outer case 54 are aligned with threaded holes 90 in the case mount 42 of the shroud assembly 26. The plurality of fasteners 46 extend axially through the plurality of non-threaded thru holes 98 in the outer case 54 and thread into the threaded holes 90 of the case mount 42 to couple the shroud assembly 26 with the outer case 54.

The case mount 42 further comprises an axial positioning surface 82, an inner sealing surface 84, an outer sealing surface 86, and a radial pilot inner surface 88. The axial positioning surface 82 positions the shroud assembly 26 axially relative the outer case assembly 28 while the radial pilot inner surface 88 abuts the outer case assembly 28 along the radial pilot outer surface 100 to align the shroud assembly 26 circumferentially around axis 11. The inner sealing surface 84 and outer sealing surface 86, seal against the outer case assembly 28 to prevent high pressure air from the centrifugal compressor 15 from escaping through the outer case assembly 28.

The axial positioning surface 82 of the case mount 42 is forward facing and perpendicular to axis 11. The axial positioning surface 82 comprises a plurality of threaded holes 90 which recess axially into the axial positioning surface 82. The plurality of threaded holes 90 may extend partially into case mount 42 as blind holes 91 or all the way through case mount 42 as thru holes 93. The plurality of threaded holes 90 are positioned circumferentially around axis 11 at radius R1.

The inner sealing surface 84 of case mount 42 is a forward facing surface positioned radially inward from the plurality of threaded holes 90 and parallel to axial positioning surface 82. The inner sealing surface 84 may be positioned forward of axial positioning surface 82 as shown in FIG. 2. In another embodiment, inner sealing surface 84 may be positioned coplanar with axial positioning surface 82.

The outer sealing surface 86 of case mount 42 is a forward facing surface positioned radially outward of the plurality of threaded holes 90 and parallel to axial positioning surface 82. The outer sealing surface 86 may be positioned aft of axial positioning surface 82 as shown if FIG. 2. In another embodiment, outer sealing surface 8 may be positioned coplanar with axial positioning surface 82.

The radial pilot inner surface 88 of case mount 42 is a radial surface that may be positioned radially outward of the plurality of threaded holes 90 as shown in FIG. 2. The radial pilot inner surface 88 abuts the radial pilot outer surface 100 on the outer case 54. This pilot interface positions the shroud assembly 26 about axis 11. In another embodiment, the radial pilot inner surface 88 and the radial pilot outer surface 100 may be positioned radially inward of the plurality of threaded holes 90.

As shown if FIG. 4 and FIG. 5, the outer case 54 further comprises an outer seal cavity 120 and an inner seal cavity 122 which house an outer seal 124 and an inner seal 126 respectively. The outer seal cavity 120 may be located radially outward of both the plurality of locating bolt assemblies 30 and the plurality of fasteners 46 and around axis 11. The outer seal cavity 120 positions the outer seal 124 radially around axis 11 and comprises an outer aft facing sealing surface 128 opposite the outer sealing surface 86 of the case mount 42. The outer seal cavity 120 is sized such that the outer seal 124 fits into the outer seal cavity 120 during assembly and as the shroud assembly 26 is urged into position by the fasteners 46, the outer seal 124 may be compressed between the outer sealing surface 86 of the shroud assembly 26 and the outer aft facing sealing surface 128 of the outer seal cavity 120 to prevent pressurized air from leaking from inside the outer case 54 through the threaded thru holes 92 and the non-threaded thru holes 98 in the outer case 54. The outer seal 124 may be any dynamic seal such as a W-seal or an O-ring seal.

The inner seal cavity 122 may be located radially inward of both the plurality of locating bolt assemblies 30 and the plurality of fasteners 46 and around axis 11. The inner seal cavity 122 both positions the inner seal 126 radially around axis 11 and comprises an inner aft facing sealing surface 130 opposite the inner sealing surface 84 of the case mount 42. The inner seal cavity 122 is sized such that the inner seal 126 fits into the inner seal cavity 122 during assembly and as the shroud assembly 26 is urged into position by the fasteners 46, the inner seal 126 may be compressed between the inner sealing surface 84 of the shroud assembly 26 and the inner aft facing sealing surface 130 of the inner seal cavity 122 to prevent pressurized air from leaking from inside the outer case 54 through the threaded thru holes 92 and the non-threaded thru holes 98 in the outer case 54. The inner seal 126 may be any dynamic seal such as a W-seal or an O-ring seal.

Figure 6:
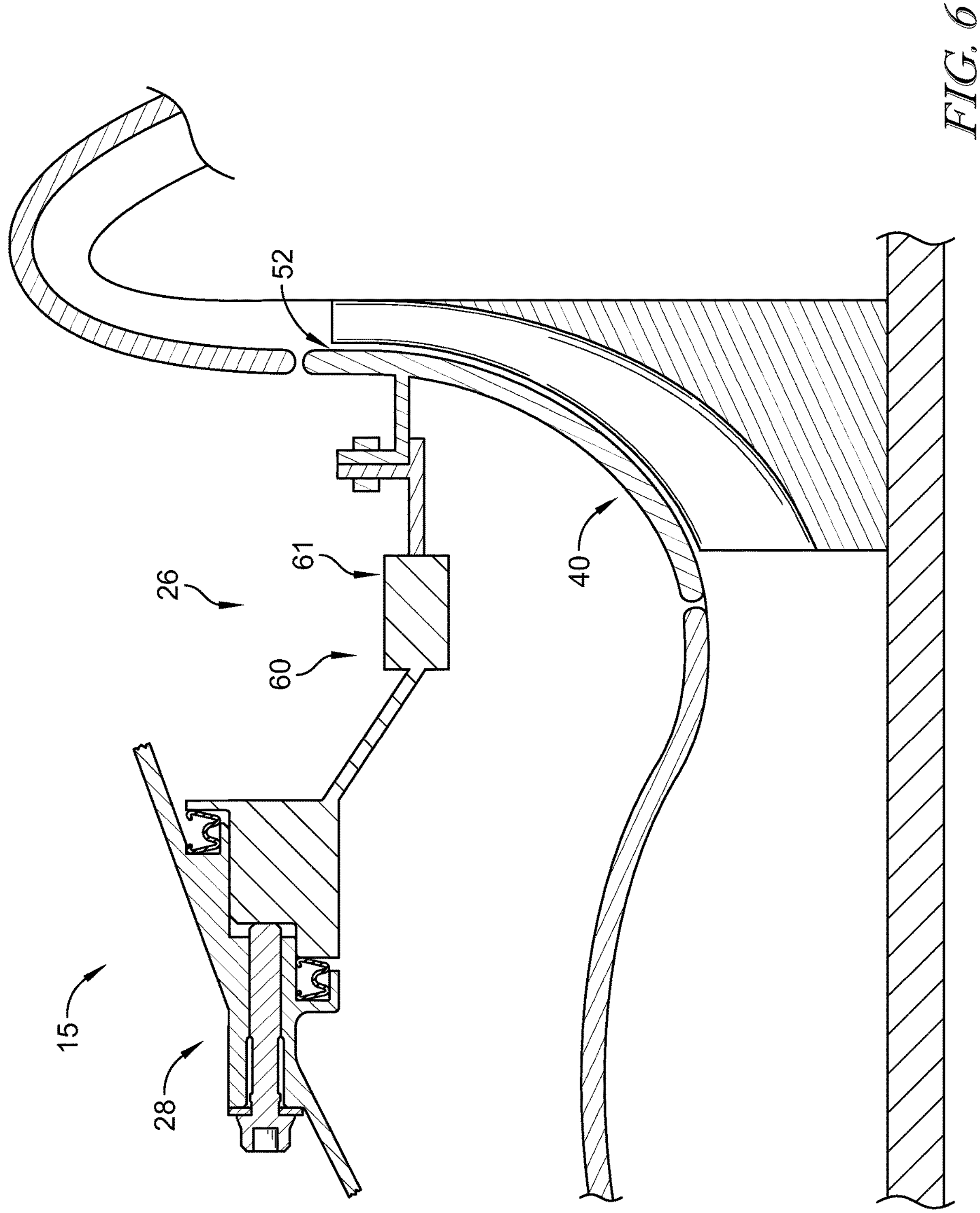
FIG. 6 is a schematic and sectional view of another centrifugal compressor assembly in accordance with some embodiments of the present disclosure showing the compressor assembly includes an impeller configured to compress air, a shroud assembly arranged around the impeller, an outer case coupled with the shroud assembly, and a plurality of locating bolt assemblies configured to selectively adjust the axial location of the shroud assembly relative to the outer case and the impeller.
Figure 7:
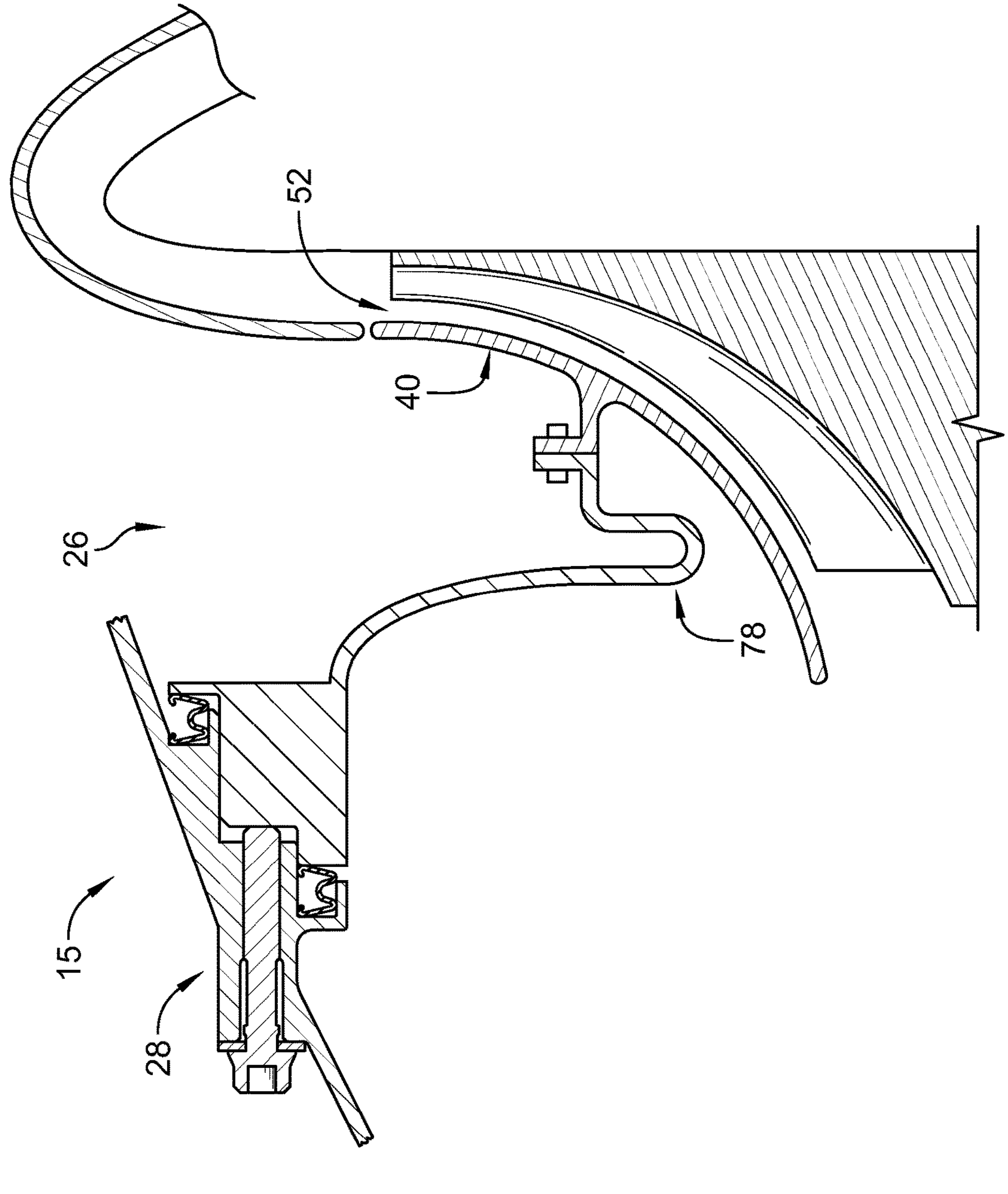
FIG. 7 is a schematic and sectional view of another embodiment of a centrifugal compressor assembly in accordance with some embodiments of the present disclosure showing the compressor assembly includes an impeller configured to compress air, a shroud assembly arranged around the impeller, an outer case coupled with the shroud assembly, and a plurality of locating bolt assemblies configured to selectively adjust the axial location of the shroud assembly relative to the outer case and the impeller.

In other embodiments, the clearance control system 60 may comprise a set of pneumatically actuated linkages, or a set of thermally actuated linkages, or a set of gear actuated linkages to dynamically move the impeller shroud 40 to maintain the desired impeller tip clearance 52 as shown in FIG. 6. In other embodiments, the actuator 62 may comprise an U-shaped member 78 that flexes under thermal or pneumatic loads or a combination of thermal and pneumatic loads to move the impeller shroud 40 to maintain the desired impeller tip clearance 52 as shown in FIG. 7.

This disclosure allows for the shroud assembly 26 to be positioned relative to the impeller 24 at variable positions. The locating bolt assemblies 30 allow a desired impeller tip clearance 52 between the impeller shroud 40 and the plurality of impeller blade tips 35 to be achieved during the building of the gas turbine engine 10, after the building of the gas turbine engine 10 without disassembling the gas turbine engine 10, and at overhaul of the gas turbine engine 10.

During the buildup of the gas turbine engine 10, the shroud assembly 26 may be positioned relative to the impeller 24 to achieve a desired impeller tip clearance 52 by installing the plurality of locating bolt assemblies 30 into the threaded thru holes 92 of the outer case 54. The plurality of locating bolt assemblies 30 may include a locating bolt 104 and a shim 106 of the desired thickness 116. An inner seal 94 and an outer seal 96 may be placed into the inner seal cavity 122 and outer seal cavity 120 of the outer case 54, respectively. The shroud assembly 26 may be placed next to the outer case 54 such that the radial pilot inner surface 88 of the case mount 42 engages the radial pilot outer surface 100 of the outer case 54 and the plurality of threaded holes 90 in the case mount 42 are aligned with the thru holes 98 of the outer case 54.

A plurality of fasteners 46 may be installed through the plurality of thru holes 98 in the outer case 54 and engaged with the threaded holes 90 of the case mount 42. The plurality of fasteners 46 may be further engaged into the threaded holes 90 of the case mount 42 to urge the radial pilot inner surface 88 into engagement with the radial pilot outer surface 100 and urge the axial positioning surface 82 of the shroud assembly 26 into abutting contact with the terminal end 102 of the plurality of locating bolts 104. As the plurality of fasteners 46 are further engaged into the threaded holes 90 of the case mount 42, the inner seal 94 may come into abutting contact with both the inner aft facing sealing surface 130 of the inner seal cavity 122 and the inner sealing surface 84 of the case mount 42. In addition, the outer seal 96 may come into abutting contact with both the outer aft facing sealing surface 128 of the outer seal cavity 120 and the outer sealing surface 86 of the case mount 42.

After the buildup of the gas turbine engine 10, the impeller tip clearance 52 may be adjusted without disassembling the compressor 14 by semi disengaging the plurality of fasteners 46. The plurality of locating bolt assemblies 30 may be removed from the plurality of threaded thru holes 92 in the outer case 54. The plurality of shims 106 in the plurality of locating bolt assemblies 30 may be replaced with a plurality of shims 106 of a different desired thickness 116 than the previously installed shims 106 or completely omitted. The impeller tip clearance 52 can be increased by replacing the original shims 106 with new shims 106 that have a desired thickness 116 greater than the original desired thickness 116. Conversely, the impeller tip clearance 52 can be decreased by replacing the original shims 106 with new shims 106 that have a desired thickness 116 less than the original desired thickness 116. The plurality of locating bolt assemblies 30 with new shims 106 may be reassembled into the threaded thru holes 92 of the outer case 54. The plurality of fasteners 46 may be reengaged into the threaded holes 90 of the case mount 42 to urge the axial positioning surface 82 of the shroud assembly 26 into abutting contact with the terminal end 102 of the plurality of locating bolts 104.

Additionally, after the gas turbine engine 10 is built, the impeller tip clearance 52 may be adjusted without disassembling the compressor 14 by semi disengaging the plurality of fasteners 46. The plurality of locating bolt assemblies 30 may be removed from the plurality of threaded thru holes 92 in the outer case 54. The plurality of locating bolts 104 in the plurality of locating bolt assemblies 30 may be replaced with a plurality of locating bolts 104 of a different locating bolt length 118 than the previously installed locating bolt length 118. The impeller tip clearance 52 can be increased by replacing the original locating bolts 104 with new locating bolts 104 that have a locating bolt length 118 less than the original locating bolt length 118. Conversely, the impeller tip clearance 52 can be decreased by replacing the original locating bolts 104 with new locating bolts 104 that have a locating bolt length 118 greater than the original locating bolt length 118. The plurality of locating bolt assemblies 30 with new locating bolts 104 may be reassembled into the threaded thru holes 92 of the outer case 54. The plurality of fasteners 46 may be reengaged into the threaded holes 90 of the case mount 42 to urge the axial positioning surface 82 of the shroud assembly 26 into abutting contact with the terminal end 102 of the plurality of locating bolts 104.

In other embodiments, the impeller tip clearance 52 may be adjusted after the gas turbine engine 10 is built without disassembling the compressor 14 by any combination of the previous two methods to adjust the impeller tip clearance 52. During engine 10 overhaul, any of the previous methods to position and adjust the shroud assembly 26 relative to the impeller 24 to achieve the desired impeller tip clearance 52 may be used or a combination of any of the previous methods.

The present disclosure provides many advantages over previous systems and methods of positioning a shroud assembly 26 relative to an impeller 24. The above embodiments allow the shroud assembly 26 to be selectively positioned and adjusted axially along axis 11 to increase the overall engine 10 efficiency by minimizing the gap between the impeller shroud 40 and the impeller blade tips 35. This positioning may be done at original engine 10 build based on component or assembly measurements to position the shroud assembly 26 in the desired location. This selective positioning may also be done at engine 10 overhaul to adjust for component wear and to reposition the shroud assembly 26 in the desired location. The position of the shroud assembly 26 can also be adjusted after the engine 10 has been assembled without the need to disassemble the engine 10. This is especially advantageous for rig and engine 10 testing to reduce the time needed when it is desired to change the cold build position of the shroud assembly 26 without having to disassemble the engine 10 to do this.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A compressor assembly for a gas turbine engine, the compressor assembly comprising an impeller arranged around an axis and configured to rotate about the axis to provide compressed air, a shroud assembly that extends circumferentially around the impeller to direct the compressed air through the impeller, the shroud assembly includes a case mount that couples the shroud assembly to the outer case assembly, an impeller shroud which confronts the impeller, and a shroud body that extends between and interconnects the impeller shroud and the case mount, an outer case assembly configured to support the shroud assembly at a desired axial location relative to the impeller, the outer case assembly having an outer case that extends circumferentially around the axis and a plurality of fasteners that extend into the outer case and the shroud assembly to couple the shroud assembly with the outer case, and a plurality of locating bolt assemblies that allow adjustment of the axial location of the shroud assembly relative to the outer case and the impeller, the plurality of locating bolt assemblies extend axially into the outer case and have terminal ends that terminate at a predetermined axial location relative to the impeller and abut the shroud assembly such that the plurality of fasteners urge the shroud assembly into abutting contact with the terminal ends of the plurality of locating bolt assemblies at an axial locating surface to axially locate the shroud assembly relative to the impeller to provide a desired size of a gap between the shroud assembly and the impeller at cold build of the compressor assembly, wherein the shroud body includes an air piston formed to define a chamber adapted to receive actuation air to selectively move the impeller shroud axially relative to the impeller to adjust the size of the gap between the shroud assembly and the impeller during use of the compressor assembly.

2. The compressor assembly of claim 1, wherein each of the plurality of locating bolt assemblies include: a locating bolt that extends axially through the outer case and defines the terminal end of the locating bolt assembly that abuts the shroud assembly and at least one shim that is located axially between the locating bolt and the outer case to cause the terminal end of the locating bolt to terminate at the predetermined axial location.

3. The compressor assembly of claim 2, wherein the terminal end of each locating bolt terminates at an axial location forward of an axial location of a terminating end of each fastener included in the plurality of fasteners.

4. The compressor assembly of claim 3, wherein the terminal end of each of at least three locating bolts of the plurality of locating bolts abut an axial facing and radially extending positioning surface of the shroud assembly without coupling with the shroud assembly.

5. The compressor assembly of claim 1, wherein the outer case assembly further includes a plurality of seals that engage the shroud assembly and the outer case to prevent the compressed air from passing between the shroud assembly and the outer case, wherein the plurality of seals includes a first seal located radially outward of the plurality of fasteners and the plurality of locating bolt assemblies and a second seal located radially inward of the plurality of fasteners and the plurality of locating bolt assemblies.

6. The compressor assembly of claim 5, wherein the first seal abuts the shroud assembly at a first sealing surface and the second seal abuts the shroud assembly at a second sealing surface wherein the first sealing surface and the second sealing surface are not coplanar with the axial locating surface of the shroud assembly.

7. The compressor assembly of claim 1, wherein the outer case and the shroud assembly comprise a pilot interface, the pilot interface comprising a first surface of the outer case that faces radially inward and extends circumferentially about the axis and a second surface of the shroud assembly that faces radially outward and extends circumferentially about the axis, wherein the first surface engages the second surface to position the shroud assembly radially relative to the impeller.

8. A compressor assembly for a gas turbine engine, the compressor assembly comprising an impeller arranged around an axis and configured to rotate about the axis to provide compressed air, a shroud assembly that extends circumferentially around the impeller to direct the compressed air through the impeller, the shroud assembly includes a case mount that couples the shroud assembly to the outer case assembly, an impeller shroud which confronts the impeller, and a shroud body that extends between and interconnects the impeller shroud and the case mount, an outer case assembly configured to support the shroud assembly at a desired axial location relative to the impeller, the outer case assembly having an outer case that extends circumferentially around the axis and a plurality of fasteners that extend into the outer case and the shroud assembly to couple the shroud assembly with the outer case, and a plurality of locating bolt assemblies that allow adjustment of the axial location of the shroud assembly relative to the outer case and the impeller, the plurality of locating bolt assemblies extend axially into the outer case and have terminal ends that terminate at a predetermined axial location relative to the impeller and abut the shroud assembly such that the plurality of fasteners urge the shroud assembly into abutting contact with the terminal ends of the plurality of locating bolt assemblies at an axial locating surface to axially locate the shroud assembly relative to the impeller to provide a desired size of a sap between the shroud assembly and the impeller at cold build of the compressor assembly, wherein the shroud body is shaped to define a U-shaped cross section when viewed normal to the axis, the U-shaped cross section includes a concave surface exposed to a first pressure and a convex surface exposed to a second pressure wherein changes to the first and second pressures cause the shroud body to flex and move the impeller shroud axially during use of the compressor assembly.

9. The compressor assembly of claim 8, wherein each of the plurality of locating bolt assemblies include: a locating bolt that extends axially through the outer case and defines the terminal end of the locating bolt assembly that abuts the shroud assembly and at least one shim that is located axially between the locating bolt and the outer case to cause the terminal end of the locating bolt to terminate at the predetermined axial location.

10. The compressor assembly of claim 9, wherein the terminal end of each locating bolt terminates at an axial location forward of an axial location of a terminating end of each fastener included in the plurality of fasteners.

11. The compressor assembly of claim 10, wherein the terminal end of each of at least three locating bolts of the plurality of locating bolts abut an axial facing and radially extending positioning surface of the shroud assembly without coupling with the shroud assembly.

12. The compressor assembly of claim 8, wherein the outer case assembly further includes a plurality of seals that engage the shroud assembly and the outer case to prevent the compressed air from passing between the shroud assembly and the outer case, wherein the plurality of seals includes a first seal located radially outward of the plurality of fasteners and the plurality of locating bolt assemblies and a second seal located radially inward of the plurality of fasteners and the plurality of locating bolt assemblies.

13. The compressor assembly of claim 12, wherein the first seal abuts the shroud assembly at a first sealing surface and the second seal abuts the shroud assembly at a second sealing surface wherein the first sealing surface and the second sealing surface are not coplanar with the axial locating surface of the shroud assembly.

14. The compressor assembly of claim 8, wherein the outer case and the shroud assembly comprise a pilot interface, the pilot interface comprising a first surface of the outer case that faces radially inward and extends circumferentially about the axis and a second surface of the shroud assembly that faces radially outward and extends circumferentially about the axis, wherein the first surface engages the second surface to position the shroud assembly radially relative to the impeller.

* * * * *